(12) United States Patent
Nagashima et al.

(10) Patent No.: US 10,469,754 B2
(45) Date of Patent: Nov. 5, 2019

(54) POSITION GUIDING DEVICE, POSITION GUIDING METHOD, AND POSITION GUIDING PROGRAM

(71) Applicant: TOPCON CORPORATION, Tokyo (JP)

(72) Inventors: Terukazu Nagashima, Tokyo (JP); Hajime Shinozaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 89 days.

(21) Appl. No.: 15/238,071

(22) Filed: Aug. 16, 2016

(65) Prior Publication Data

US 2017/0061605 A1    Mar. 2, 2017

(30) Foreign Application Priority Data

Aug. 25, 2015  (JP) .................................. 2015-166085

(51) Int. Cl.
  *G01C 15/06*  (2006.01)
  *H04N 5/232*  (2006.01)
  (Continued)

(52) U.S. Cl.
  CPC ....... *H04N 5/23293* (2013.01); *G01C 15/002* (2013.01); *G06T 7/70* (2017.01); *G01S 7/003* (2013.01); *G01S 17/66* (2013.01)

(58) Field of Classification Search
  CPC ..... H04N 5/23293; G06T 7/70; G01C 15/002
  See application file for complete search history.

(56) References Cited

U.S. PATENT DOCUMENTS

| | | | |
|---|---|---|---|
| 7,222,021 B2 * | 5/2007 | Ootomo ................. | G01C 15/00 348/36 |
| 2012/0242830 A1 * | 9/2012 | Kumagai ............. | G01C 15/004 348/135 |

(Continued)

FOREIGN PATENT DOCUMENTS

| | | |
|---|---|---|
| JP | 10-281764 | 10/1998 |
| JP | 2006-78415 | 3/2006 |

(Continued)

OTHER PUBLICATIONS

Office Action dated Apr. 23, 2019 in corresponding Japanese Patent Application No. 2015-166085 with English translation.

*Primary Examiner* — Christopher G Findley
(74) *Attorney, Agent, or Firm* — Wenderoth, Lind & Ponack, L.L.P.

(57) ABSTRACT

A position guiding device includes a mobile terminal having an imaging part and display, a position information acquiring part for acquiring current coordinate information and target coordinate information, a direction sensor for acquiring direction information, and a controller to generate a target image. The mobile terminal is attached to a pole so as to position a pole tip within an angle of view. The controller acquires, from the position information acquiring part, current coordinate information representing a position at where the pole tip points, defines a horizontal surface including the pole tip as a measurement surface, generates corrected coordinate information by shifting the target coordinate information to a position on the measurement surface, generates the target image in which a target position marker is put at a position representing the corrected coordinate information in the image obtained by the imaging part.

8 Claims, 11 Drawing Sheets

(51) Int. Cl.
    *G01C 15/00*     (2006.01)
    *G06T 7/70*     (2017.01)
    *G01S 17/66*     (2006.01)
    *G01S 7/00*     (2006.01)

(56) References Cited

U.S. PATENT DOCUMENTS

| | | | | |
|---|---|---|---|---|
| 2013/0162469 A1* | 6/2013 | Zogg | ............... | G01C 15/002 342/357.25 |
| 2014/0156219 A1* | 6/2014 | Soubra | ............... | G01C 15/00 702/150 |
| 2014/0232859 A1* | 8/2014 | Kotzur | ............... | G01C 1/04 348/135 |
| 2015/0219455 A1* | 8/2015 | Jordil | ............... | G01C 9/00 33/228 |
| 2015/0268045 A1* | 9/2015 | Dusha | ............... | G01C 15/06 33/228 |
| 2016/0146604 A1* | 5/2016 | Metzler | ............... | G01C 15/00 33/228 |
| 2017/0067739 A1* | 3/2017 | Siercks | ............... | G01C 15/002 |

FOREIGN PATENT DOCUMENTS

| | | |
|---|---|---|
| JP | 2012-202821 | 10/2012 |
| JP | 2013-32983 | 2/2013 |

* cited by examiner

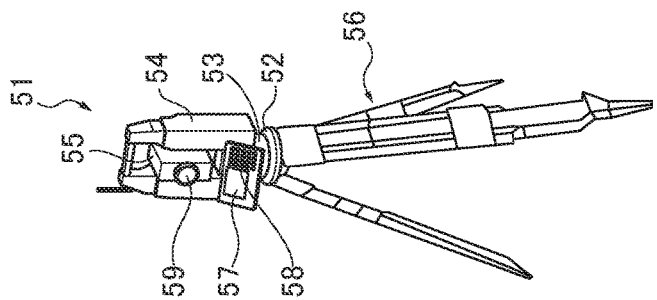
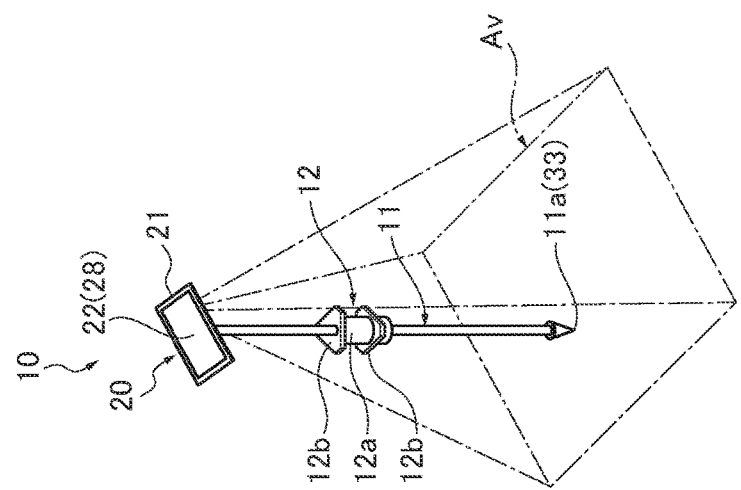
FIG.1

POSITION GUIDING DEVICE, POSITION GUIDING METHOD, AND POSITION GUIDING PROGRAM

CROSS-REFERENCE TO RELATED APPLICATION

The present application is based on and claims priority to Japanese patent application No. 2015-166085, filed on Aug. 25, 2015, the disclosure of which is hereby incorporated by reference herein in its entirety.

BACKGROUND

Technical Field

This invention relates to a position guiding device, a position guiding method, and a position guiding program.

Description of Related Art

For a surveying operation, a measurement and installation work is performed to install a marker at a predetermined position by planting a stake using a surveying instrument such as a total station. During the measurement and installation work, the surveying instrument surveys a target position and guides an operator to an installation point (target position) to plant a stake at the target position. Here, the operator may move a collimation target (reflection part), which is provided at a pole and used as a reference for the positioning, to a predetermined horizontal coordinate position in accordance with the guidance of the survey, determine a vertical lower position of the horizontal coordinate position with a bubble tube provided at the pole, and then plant a stake at the appropriate installation point (target position).

In the above procedure, it is, however, not easy and convenient to move the collimation target to the predetermined horizontal coordinate position. Hence, there is known a technique in which a mobile terminal displays a current position and an installation point on an installation map (for example, JP2012-202821 A). With this conventional technique, the operator can confirm a positional relationship of the current position and installation point by using the mobile terminal (to be specific, the display thereof). As a result, it becomes easy for the operator to move to the installation point (target position).

SUMMARY

In the above technique, the operator confirms a distance and a direction from the current position to the installation point based on the installation map displayed on the mobile terminal. That is to say, the operator needs to move to the target point while comparing the actual field with the mobile terminal (i.e., the displayed image). Further, the operator needs to confirm the distance and direction to the installation point in the actual field in accordance with the installation map (i.e., information displayed on the mobile terminal). However, it is sometimes not easy to confirm the installation point in the actual field. Therefore, the above technique still has room for improvement to allow the operator to confirm an installation point (target position) easily and accurately.

An object of the present invention is, therefore, to provide a position guiding device, a position guiding method, and position guiding program that allow an operator to confirm a target position easily and accurately.

To achieve the above object, an aspect of the present invention provides a position guiding device

BRIEF DESCRIPTION OF DRAWINGS

FIG. 1 is an explanatory view schematically illustrating a configuration of a survey system using a position guiding device according to an embodiment of the present invention;

DETAILED DESCRIPTION

Figure 2:
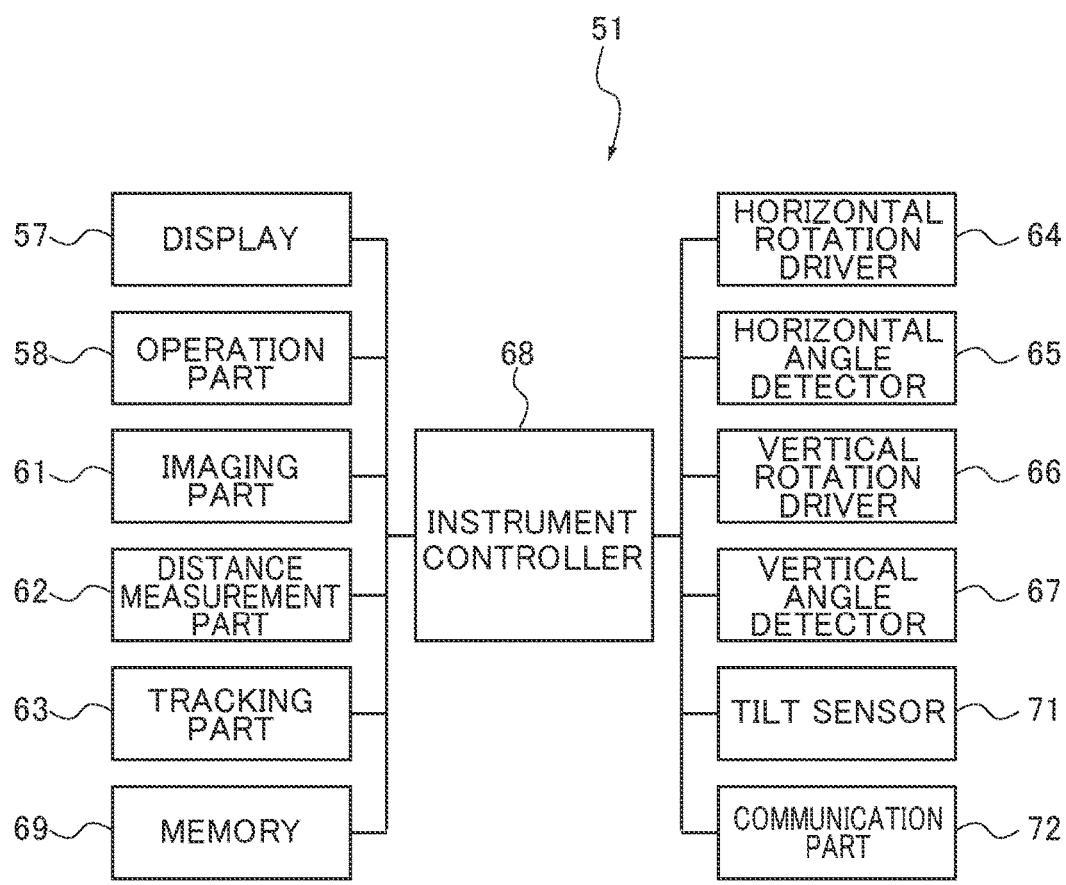
FIG. 2 is a block diagram for explaining an internal configuration of a surveying instrument.

Hereinafter, an embodiment of a position guiding device and a position guiding method according to the present invention will be described with reference to the drawings.

Embodiment

First, a schematic configuration of a survey system 50 using a position guiding device 10 according to an embodiment of the present invention will be described. As illustrated in FIG. 1, the survey system 50 guides an operator W (shown in FIG. 10) having the position guiding device 10 from a position (current position) of the position guiding device 10 detected by a surveying instrument 51 to a target position (e.g., an surveying point Sp (shown in FIG. 10)). With this, the survey system 50 allows the operator W to confirm the target position (e.g., a surveying point Sp) accurately. The position guiding device 10 is configured such that the operator W can easily confirm the target position accurately. Note that the target position is indicated with a three-dimensional coordinate.

In the embodiment, the surveying instrument 51 is configured as a total station and is installed at a known point. The surveying instrument 51 emits a pulse laser to a measurement point, receives a reflection light (reflected pulse light) of the pulse laser reflected on the measurement point to measure a distance for each pulse, and determines the distance with a high accuracy by averaging the measured distances. Note that a method to measure the distance used by the surveying instrument 51 should not be limited to the above example. For instance, the method may be a phase difference type measurement that uses a light beam modulated by a predetermined frequency. The surveying instrument 51 includes a leveling part 52, a base part 53, a frame part 54, a telescope part 55, and a tripod 56.

The leveling part 52 is connected to the tripod 56. The base part 53 is installed on the leveling part 52 such that a tilt angle of the base part 53 is adjustable with respect to the leveling part 52. The frame part 54 is installed on the base part 53 rotatably around a vertical axis. The frame part 54 is equipped with a display 57 and an operation part 58. The operation part 58 is manipulated to operate various functions of the surveying instrument 51 and output information (signals) corresponding to the manipulation input thereto to an instrument controller 68 (shown in FIG. 2).

The telescope part 55 is installed in the frame part 54 rotatably around the horizontal axis. The telescope part 55 includes a telescope 59 for collimating a measuring object and an imaging part 61 (shown in FIG. 2) for obtaining an image (telescopic image) in the collimation direction using an optical system of the telescope 59. The imaging part 61 is, for example, a digital camera that outputs a photographed image as digital image signals. Further, the telescope part 55 includes a distance measuring part 62 and a tracking part 63 (shown in FIG. 2). The distance measuring part 62 and tracking part 63 share the optical system with the telescope 59. The distance measuring part 62 emits a measurement light, receives a reflected light from the measuring object (a target 12), and performs a light wave distance measurement to measure a distance to the measuring object. The tracking part 63 emits a tracking light, receives a reflected light from a tracking object (the target 12), and detects a position of the tracking object.

As illustrated in FIG. 2, the frame part 54 further includes a horizontal rotation driver 64 and a horizontal angle detector 65. The horizontal rotation driver 64 rotates the frame part 54 around a vertical shaft with respect to the base part 53 (i.e., rotates the frame part 54 in the horizontal direction). The horizontal angle detector 65 detects a horizontal rotation angle of the frame part 54 with respect to the base part 53 so as to detect a horizontal angle of the surveying instrument 51 in the collimation direction.

The frame part 54 further includes a vertical rotation driver 66 and a vertical angle detector 67. The vertical rotation driver 66 rotates the telescope part 55 around a horizontal shaft with respect to the frame part 54 (i.e., rotates the telescope part 55 in the vertical direction). The vertical angle detector 67 detects a vertical angle of the telescope part 55 with respect to the frame part 54 so as to detect a vertical angle of the surveying instrument 51 in the collimation direction.

The frame part 54 further includes the instrument controller 68. The instrument controller 68 integrally controls the surveying instrument 51 in accordance with program stored in a memory 69 connected to the instrument controller 68. The memory 69 stores arithmetic program for the measurement, arithmetic program for the tracking, image process program for image processing, data transmission program for generating and transmitting information, and the like. Note that the generated information is transmitted to a terminal controller 24 (a communication part 26) of a mobile terminal 20 in the position guiding device 10 via a communication part 72. As illustrated in FIG. 2, the instrument controller 68 is connected to the display 57, the operation part 58, the imaging part 61, the distance measuring part 62, the tracking part 63, the horizontal rotation driver 64, the horizontal angle detector 65, the vertical rotation driver 66, the vertical angle detector 67, the memory 69, a tilt sensor 71, and the communication part 72.

The tilt sensor 71 detects a tilt or inclination of the surveying instrument 51 (i.e., telescope part 55). The tilt sensor 71 of the embodiment is provided at the leveling part 52 and detects a tilt of the surveying instrument 51 by detecting a tilt of the leveling part 52 with respect to the horizontal surface. The tilt sensor 71 outputs the detected tilt (to be specific, information of the detected tilt) of the surveying instrument 51 to the instrument controller 68. Note that as long as the tilt sensor 71 is able to detect a tilt of the surveying instrument 51 (i.e., the telescope part 55), the tilt sensor 71 may be provided at another part such as the frame part 54.

The communication part 72 allows the terminal controller 24 and instrument controller 68 to communicate with each other via the communication part 26 of the mobile terminal 20. The communication part 72 is controlled by the instrument controller 68 to transmit the information stored in the memory 69. The communication part 72 of the embodiment is capable of performing wireless communication. Therefore, the instrument controller 68 wirelessly exchanges the data (information) with the terminal controller 24 via the communication part 72.

The instrument controller 68 receives output values from the distance measuring part 62, the tracking part 63, the horizontal angle detector 65, the vertical angle detector 67, and the tilt sensor 71. The instrument controller 68 measures or calculates a distance, an angle of elevation, and a horizontal angle based on the output values. The instrument controller 68 then stores the measurement results and displays the results on the display 57. Further, the measurement results are transmitted to the terminal controller 24 via the communication part 72.

The image obtained (photographed) by the imaging part 61 is stored in the memory 69 and displayed on the display 57. The instrument controller 68 performs image processing on the image stored in the memory 69 (e.g., an image obtained by the imaging part 61). The processed image is then stored in the memory 69 and displayed on the display 57.

The instrument controller 68 drives the horizontal rotation driver 64 and vertical rotation driver 66 and rotates the frame part 54 and telescope part 55 to turn the telescope part 55 to a predetermined direction. Accordingly, the instrument controller 68 scans a predetermined range. Further, the instrument controller 68 controls the distance measuring part 62 to measure a distance to a measuring object (e.g., the target 12). To be specific, the instrument controller 68 measures or calculates an angle of elevation and a horizontal angle in the collimation direction to determine a three-dimensional coordinate position of the measurement object (e.g., the target 12). The instrument controller 68 then generates subject coordinate information 32 representing a current position of the measurement object based on the determined three-dimensional coordinate position (i.e., the center position of the target 12). The generated subject coordinate information 32 is then transmitted to the terminal controller 24 via the communication part 72. The instrument controller 68 further drives the horizontal rotation driver 64 and vertical rotation driver 66 in accordance with position information of the tracking object (i.e., the target 12) transmitted from the tracking part 63. With this, the instrument controller 68 turns the telescope part 55 toward the tracking object (i.e., the instrument controller 68 moves the telescope part 55 to track the tracking object). Accordingly, the instrument controller 68 measures a distance to the tracking object (measuring object) while tracking the tracking object, thereby successively determining a three-dimensional coordinate position of the moving measuring object. That is to say, the leveling part 52, the base part 53, the frame part 54, the telescope part 55, the tripod 56, the telescope 59 (the imaging part 61), the distance measuring part 62, the tracking part 63, the horizontal rotation driver 64, the horizontal angle detector 65, the vertical rotation driver 66, the vertical angle detector 97, and the tilt sensor 71 of the surveying instrument 51 represent and function as a measuring unit controlled by the instrument controller 68.

Here, it is possible to input target coordinate information 31 (coordinate information of the target position) into the instrument controller 68. The target coordinate information 31 is then stored in the memory 69 and displayed on the display 57. The target coordinate information 31 may be input by an external device via the communication part 72, by an external device connected to the instrument controller 68, or by using the operation part 58. The instrument controller 68 then transmits the target coordinate information 31 to the terminal controller 24 via the communication part 72. With the surveying instrument 51, the instrument controller 68 measures and determines a current position (three-dimensional coordinate position) of the position guiding device 10 and transmits the determined coordinate information (measurement result) to the terminal controller 24 of the mobile terminal 20.

Figure 3:
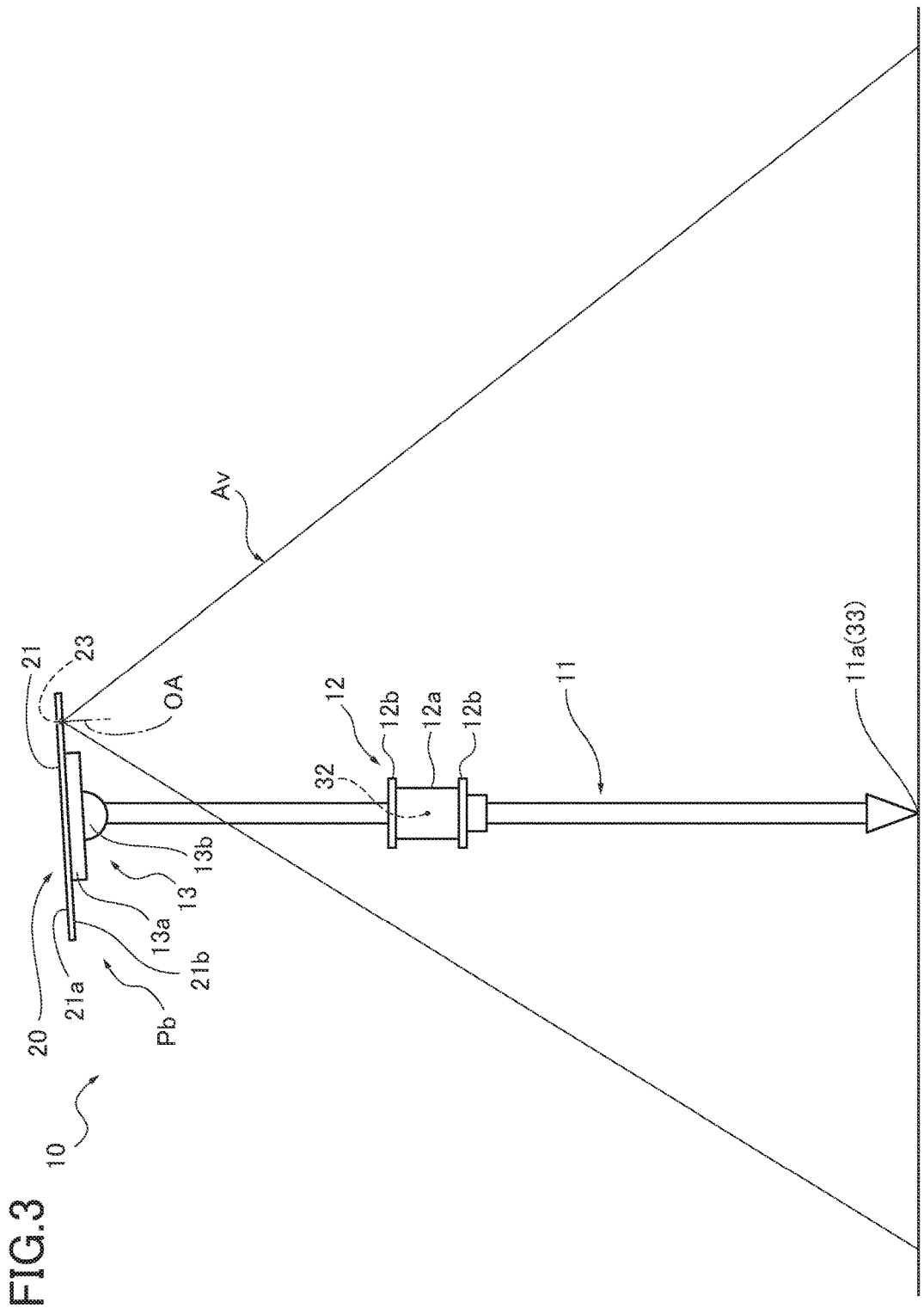
FIG. 3 is an explanatory view schematically illustrating a configuration of the position guiding device.

As illustrated in FIG. 1, the position guiding device 10 is provided with a surveying pole 11, the target 12, and the mobile terminal 20. The surveying pole 11 is held by the operator W when the operator W moves the target 12 and mobile terminal 20. The surveying instrument 51 uses the surveying pole to acquire a three-dimensional position of a pole tip 11a (to be specific, a position of a point indicated by the pole tip 11a). A head of the surveying pole 11 is provided with an attaching part 13, as illustrated in FIG. 3. The attaching part 13 includes a supporting part 13a to support the mobile terminal 20 and a pivot 13b attached to the supporting part 13a. The pivot 13b is capable of adjusting a tilt angle of the mobile terminal 20 (i.e., a tilt angle of the surveying pole 11 with respect to the mobile terminal 20).

The target 12 is provided at an arbitrary height in the surveying pole 11. The target 12 of the embodiment is configured with a prism 12a sandwiched by a pair of supporting plates 12b in the up-and-down direction. The prism 12a of the embodiment is an all-around (360°) prism configured by providing a plurality of corner cube prisms over the entire circumference of the prism 12a. Therefore, the target 12 (prism 12a) reflects an incident light along the incident direction regardless of the direction of the incident light (e.g., measurement light and tracking light). Accordingly, the target 12 functions as the measuring object that reflects a measuring light emitted from the distance measuring part 62 of the surveying instrument 51 for measuring the distance to the measuring object. Also, the target 12 functions as the tracking object that reflects a tracking light emitted from the tracking part 63 of the surveying instrument 51 for turning the telescope part 55 to the tracking object (i.e., for tracking the tracking object). With this, the surveying instrument 51 measures a coordinate position (a three-dimensional coordinate position) of the target 12 (i.e., the center position of the prism 12a) using the distance measuring part 62. Further, the surveying instrument 51 determines the subject coordinate information 32 representing the current position of the target 12.

The target 12 is attached to the surveying pole 11 such that the axis of the target 12 is aligned with the axis of the surveying pole 11. Since the target 12 is fixed to the surveying pole 11 together with the mobile terminal 20, the positional relationship between the center positions of the target 12 and mobile terminal 20 and the positional relationship between the center positions of the target 12 and pole tip 11a are also fixed. The target 12 of the embodiment is provided with a spirit level 14 at the upper supporting plate 12b. The spirit level 14 of the embodiment is configured with a hollow circular plate containing liquid and a bubble so as to detect levelness. With the spirit level 14, the operator W determines whether the surveying pole 11 is vertically aligned (i.e., the longitudinal direction of the surveying pole 11 is arranged in parallel to the vertical direction). Note that the installation point of the spirit level 14 should not be limited to the above configuration. For instance, the spirit level 14 may be provided at another part of the target 12 or at the surveying pole 11.

As illustrated in FIGS. 1 and 3, the mobile terminal 20 of the embodiment includes a display 22 and an imaging part 23 and is contained in a casing 21 of thin and rectangular parallelepiped shape. The casing 21 is supported by the supporting part 13a of the attaching part 13 and is allowed to adjust the position of the casing 21 with respect to the surveying pole 11.

The display 22 is provided on a front surface 21a of the casing 21. The display 22 is controlled by the terminal controller 24 and displays scene images Ps obtained by the imaging part 23 immediately and successively. The display 22 further displays a target image 41, a level marker 44, a position guide marker 45, and/or a position information button 46 that are generated by the terminal controller 24. Here, the display 22 of the embodiment functions as a touch panel.

The imaging part 23 includes an imaging optical system 23a and an imaging element 23b provided at an image forming position of the imaging optical system 23a. The imaging optical system 23a includes at least one lens. Both the imaging optical system 23a and the imaging element 23b are fixed inside the casing 21 and obtain the scene images Ps. In the imaging part 23 of the embodiment, an objective lens of the imaging optical system 23a is provided on a back surface 21b of the casing 21 and is exposed to outside of the casing 21 such that an imaging optical axis OA of the imaging optical system 23a is directed to a direction orthogonal to the back surface 21b. Accordingly, the scenery viewed by the operator W is displayed as the scene image Ps on the display 22. In the imaging part 23, an angle of view Av is determined by the imaging optical system 23a and imaging element 23b (to be specific, the angle of view Av is set in accordance with the optical design of the imaging optical system 23a and imaging element 23b in advance).

The terminal controller 24, a tilt sensor 25, the communication part 26, and a memory 27 of the mobile terminal 20 are contained in the casing 21. The terminal controller 24 integrally controls the operation of the mobile terminal 20 in accordance with program stored in the memory 27. The memory 27 also stores program for calculating a coordinate position of the pole tip 11a and the like based on signals sent from the surveying instrument 51, program for calculating a direction to which the imaging part 23 turns based on a signal sent from the tilt sensor 25, program for generating image data based on signals sent from the imaging part 23, image processing program for generating and displaying the target image 41, the level marker 44, and the position guide marker 45, image processing program for displaying the position information button 46, and the like.

Figure 5:
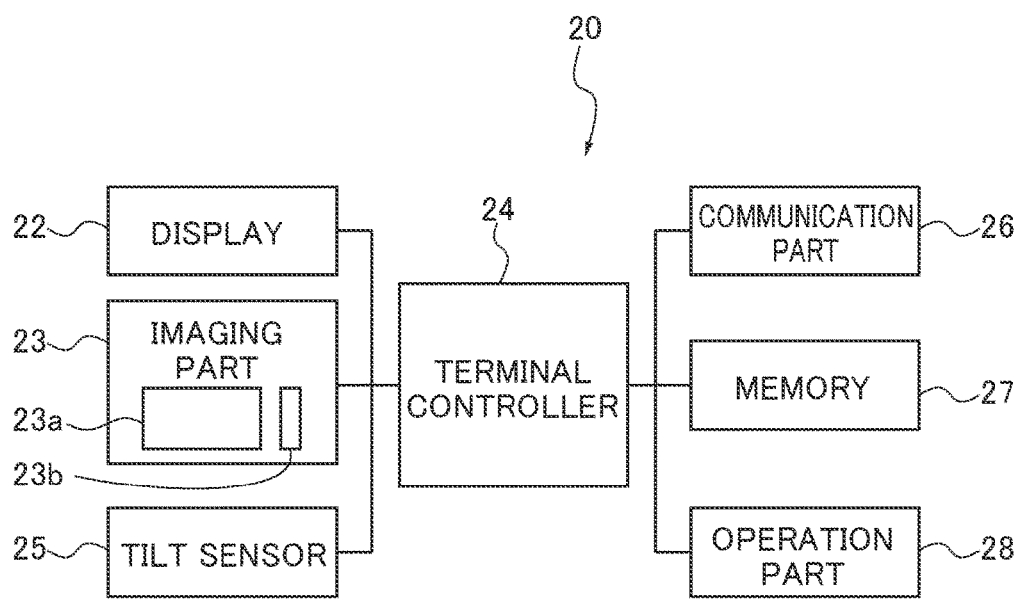
FIG. 5 is a block diagram for explaining an internal configuration of the mobile terminal.

As illustrated in FIG. 5, the terminal controller 24 is connected to the display 22, the imaging part 23, the tilt sensor 25, the communication part 26, the memory 27, and an operation part 28. The terminal controller 24 integrally controls the display 22, the imaging part 23, the tilt sensor 25, the communication part 26, and the operation part 28. To be specific, in accordance with the programs stored in the memory 27, the terminal controller 24 generates image data based on signals sent from the imaging part (i.e., the imaging element 23b thereof), displays the scene image Ps based on the generated image data on the display 22, and controls the mobile terminal 20 to, for example, determine a tilt state of the mobile terminal 20 based on signals sent from the tilt sensor 25. The terminal controller 24 stores the generated scene image Ps (i.e., the image data) in the memory 27 and displays the scene image Ps on the display 22. The terminal controller 24 receives tilt information (data) detected by the tilt sensor 25 and operation information (data) input through the operation part 28.

The tilt sensor 25 detects a tilt angle and a tilt direction (hereinafter, also called a "tilt state") with respect to a reference posture Pb of the mobile terminal 20 and acquires the tilt information representing the tilt state. The tilt sensor 25 of this embodiment is an acceleration sensor to measure a tilt level with respect to the gravity direction. Accordingly, the tilt sensor 25 detects a tilt state (i.e., tilt level) of the imaging part 23 (to be specific, the optical axis OA thereof) with respect to the gravity direction. In the embodiment, the reference posture Pb of the mobile terminal 20 represents a posture of the mobile terminal 20 in which the surveying pole 11 is arranged in parallel to the vertical direction. Accordingly, the tilt sensor 25 of the embodiment is capable of detecting the tilt and the tilt direction with respect to the vertical direction. That is, the tilt sensor 25 functions as a direction sensor for acquiring a direction to which the imaging part 23 turns. Note that as long as the tilt sensor 25 is capable of detecting a tilt state with respect to the reference posture Pb, the configuration of the tilt sensor 25 should not be limited to the above example. For instance, the tilt sensor may be configured with a gyro sensor.

The communication part 26 allows the instrument controller 68 and terminal controller 24 to communicate with each other via the communication part 72 of the surveying instrument 51 and receives various information (e.g., the target coordinate information 31, object information 32) from the instrument controller 68. Here, the communication part 26 is capable of performing wireless communication. Therefore, the terminal controller 24 wirelessly exchanges the data (information) with the instrument controller 68 via the communication part 26. The terminal controller 24 stores the received various information in the memory 27.

The operation part 28 is operated to utilize the various functions of the mobile terminal 20 and outputs the manipulation input to the terminal controller 24. The operation part 28 of the embodiment is an image displayed on the touch panel display 22. To be specific, the operator W inputs a manipulation to start the measurement and installation work, a manipulation to finish a position guiding process, a manipulation to finish the measurement and installation work, a manipulation to set the reference posture, a manipulation to switch a target, and the like. Note that the operation part 28 may independently be provided from the display 22 at the casing 21.

Figure 4:
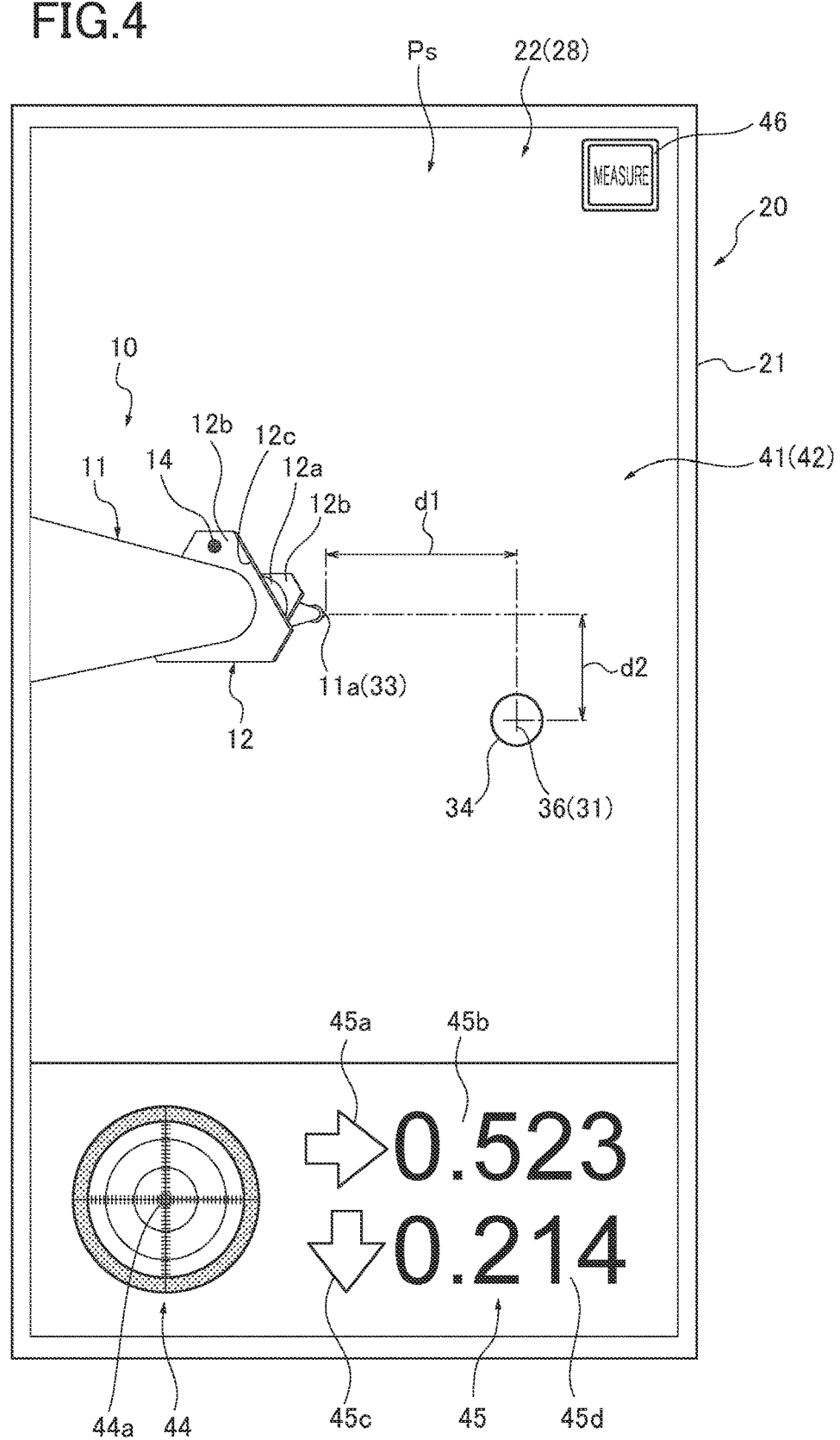
FIG. 4 is an explanatory view illustrating an example of a target image (scene image) displayed on a display of a mobile terminal of the position guiding device.

With the position guiding device 10, the operator W adjusts the posture of the mobile terminal 20 with respect to the surveying pole 11 and fixes the adjusted mobile terminal 20 to the pole tip 11a. To be specific, the operator W positions the pole tip 11a within the angle of view Av of the operation part 28 and adjusts the tilt angle (inclination) of the mobile terminal 20 in consideration of usability. Accordingly, when the scene image Ps is displayed on the display 22 of the mobile terminal 20, the pole tip 11a appears in the scene image Ps, as illustrated in FIG. 4. Further, since the casing 21 is fixed to the surveying pole 11 and the imaging part 23 is fixed to the casing 21, the positional relationship between the surveying pole 11 (the pole tip 11a) and the imaging part 23 is fixed.

As illustrated in FIG. 4, the target 12 is provided at a position of the surveying pole 11 between the mobile terminal 20 and the pole tip 11a. In the embodiment, at least a part of the target 12 is positioned within the angle of view Av of the imaging part 23. Since the size of the target 12 and the angle of view Av of the imaging part 23 are known, the distance from the mobile terminal 20 (i.e., the imaging part 23 thereof) to the target 12 is calculated by acquiring the displayed size of the target 12 in the scene image Ps. In the embodiment, an outer edge portion 12c of the upper supporting plate 12b (i.e., a part of the target 12) is positioned within the angle of view Av. Note that the positional relationship of the outer edge portion 12c and center position of the prism 12a is determined in advance.

Next, the operation of the terminal controller 24 according to the embodiment will be described. As described above, the terminal controller 24 receives the target coordinate information 31 of the target position (e.g., the surveying point Sp) from the instrument controller 68 via the communication part 26. The target coordinate information 31 represents a target position in the three-dimensional coordinate.

The terminal controller 24 further receives the subject coordinate information 32 representing the current position of the target 12 (to be specific, the center position of the target 12) from the instrument controller 68. The subject coordinate information 32 represents the center position of the target 12 (i.e., the center position of the plurality of corner cube prisms) in the three-dimensional coordinate.

The terminal controller 24 detects the outer edge portion 12c of the supporting plate 12b in the scene image Ps and determines the distance from the imaging part 23 to the outer edge portion 12c (i.e., to the target 12) based on a length and angle of view Av of the imaging part 23 in the scene image Ps. This length in the scene image Ps is measured in accordance with the gap (the number of pixels) on the imaging element 23b of the imaging part 23 in consideration of the angle of view Av. Accordingly, the terminal controller 24 determines the distance and the positional relationship between the imaging part 23 and center position of the target 12. Here, the mobile terminal 20 is attached to the head of the surveying pole 11 with the attaching part 13, and the length of the surveying pole 11 and position of the imaging part 23 with respect to the mobile terminal 20 are determined in advance. Therefore, the terminal controller 24 can determine the position of the imaging part 23 with respect to the surveying pole 11 and then the length and positional relationship between the pole tip 11a and imaging part 23. The terminal controller 24 stores these determined results in the memory 27 and retrieves the stored results from the memory 27. Note that the positional relationships among the imaging part 23 (mobile terminal 20), target 12, and pole tip 11a change in accordance with the tilt state.

The terminal controller 24 detects the posture (the tilt angle and the tilt direction) of the casing 21 with respect to the vertical direction using the tilt sensor 25 and sets the detected posture as the reference posture Pb of the mobile terminal 20 when the surveying pole 11 is arranged in parallel to the vertical direction and a command to set the reference posture Pb is input to the operation part 28. Here, the spirit level 14 is used to confirm that the surveying pole 11 is arranged in parallel to the vertical direction. Based on the detection signal of the tilt sensor 25, the terminal controller 24 detects the tilt state and tilt direction of the imaging part 23 with respect to the reference posture Pb. By acquiring the subject coordinate information 32 (i.e., the center position coordinate of the target 12) from the surveying instrument 51 and further acquiring the detection signal from the tilt sensor 25, the terminal controller 24 determines the coordinate positions of the mobile terminal 20 and pole tip 11a, thereby determining the direction to which the imaging part 23 (i.e., the angle of view Av of the imaging part 23) turns. Accordingly, the terminal controller 24 determines current coordinate information 33 representing the current position of the pole tip 11a based on the subject coordinate information 32.

As described above, the position guiding device 10 is capable of determining the current coordinate information 33 representing the point indicated by the pole tip 11a. Accordingly, the target 12 and communication part 26 of the position guiding device 10 together with the terminal controller 24 function as a position information acquiring part that acquires the target coordinate information 31, which represents the target position (e.g., the surveying point Sp), and the current coordinate information 33, which represents the current position.

Figure 12:
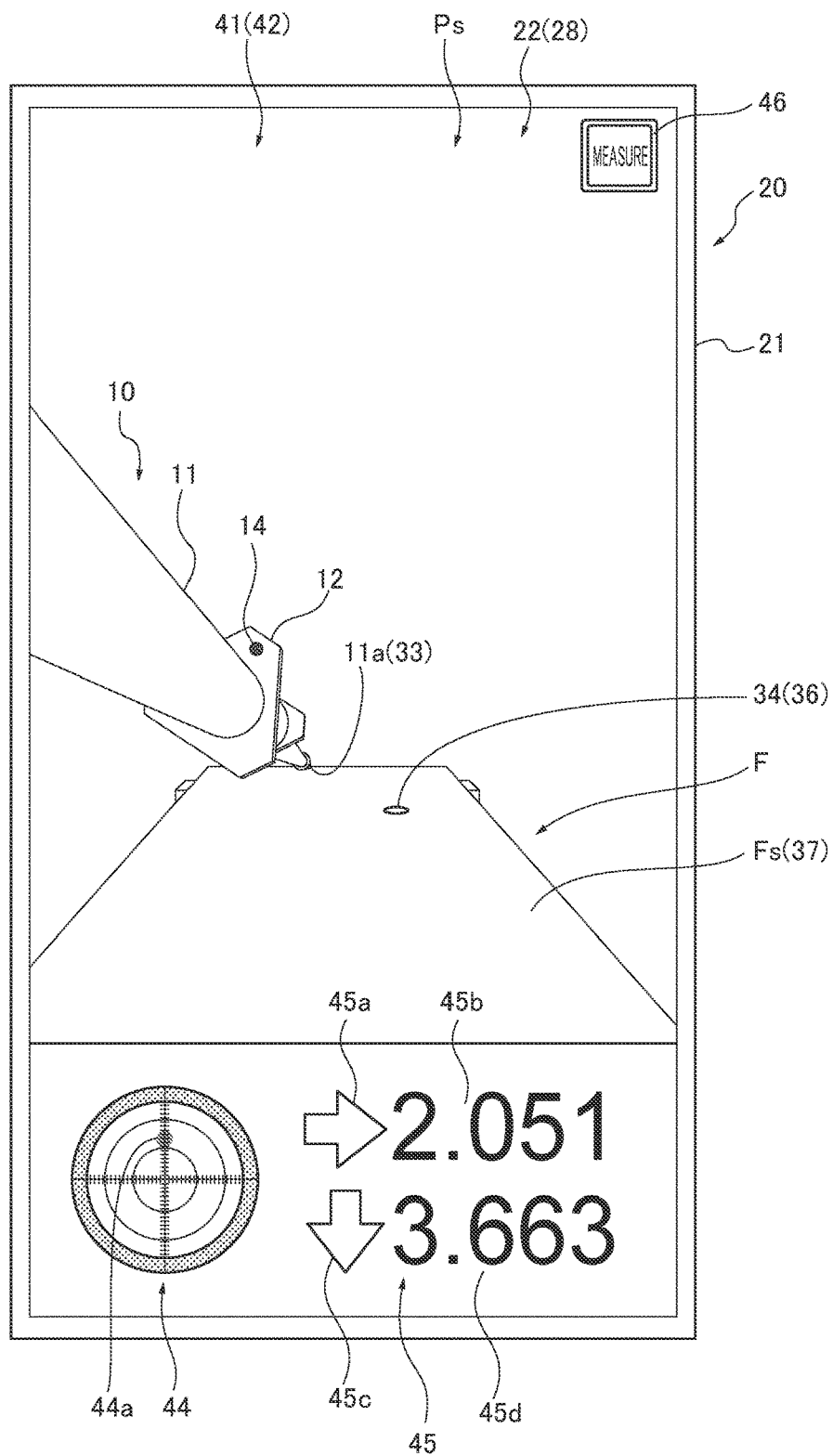
FIG. 12 is an explanatory view illustrating a case where a target direction marker is shown in the scene image under another situation illustrated in FIG. 10.

Further, the terminal controller 24 performs control process to achieve a target information indicating function. As illustrated in FIGS. 4 and 12, the target information indicating function generates and displays, on the display 22, the target image 41 that shows the target position marker 34 over the scene image Ps. The target position marker 34 facilitates recognizing the target position such as the surveying point Sp in the scene image Ps when the target position is present near the current position. The target position marker 34 is put at the target position in the scene image Ps. In the embodiment, the target position marker 34 is shown with a circle.

Figure 11:
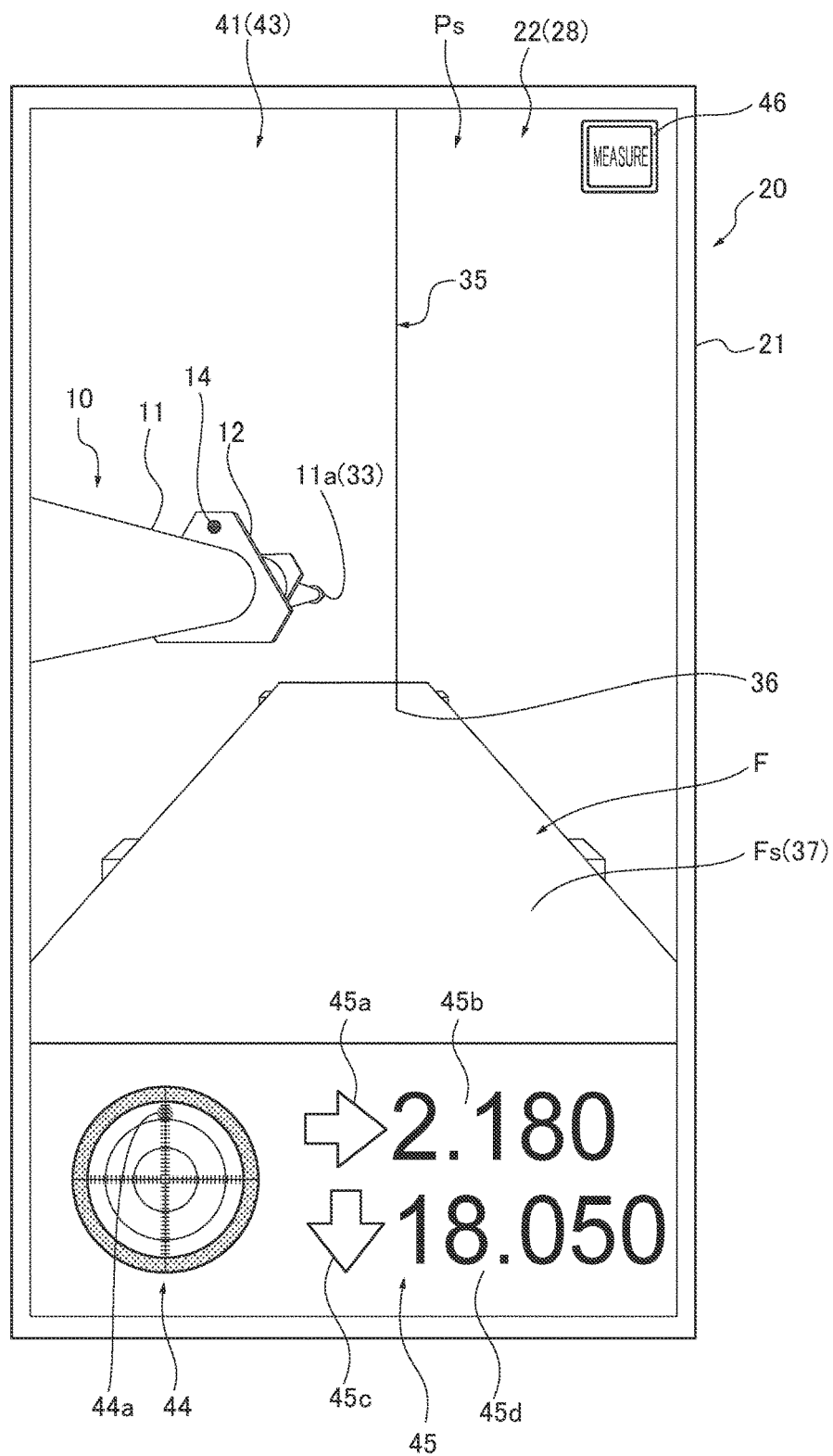
FIG. 11 is an explanatory view illustrating a case where a target direction marker is shown in the scene image under a situation illustrated in FIG. 10.

As illustrated in FIG. 11, the target information indicating function further generates and displays, on the display 22, the target image 41 that shows the target direction marker 35 over the scene image Ps. The target direction marker 35 facilitates recognizing the direction in which the target position such as the surveying point Sp is present in the scene image Ps when the target position is far from the current position. The target direction marker 35 is put at the target position in the scene image Ps. In the embodiment, the target direction marker 35 is a straight line extending in the vertical direction.

The terminal controller 24 generates corrected coordinate information 36 to correctly position the target position marker 34 and target direction marker 35 in the scene image Ps. As described above, the terminal controller 24 is capable of determining the target coordinate information 31 within the angle of view Av based on the acquired coordinate position of the imaging part 23 and angle of view Av. However, the target position (the coordinate position corresponding to the target coordinate information 31) in the scene image Ps may not be present on a surface (Fs in FIG. 6) but present at a position having a different height from the surface Fs. If the target position marker 34 or the target direction marker 35 are shown in the scene image Ps at the position corresponding to such target coordinate information 31, the target position marker 34 or the target direction marker 35 are displayed at a different position from the actual target position. This will be explained with reference to FIGS. 6 and 7. FIG. 7 illustrates an example in which a target position marker 34 is shown over the scene image Ps in accordance with the situation illustrated in FIG. 6. In FIG. 7, the target position marker 34 is wrongly shown in the scene image Ps. Note that the position guiding device 10 (, the pole tip 11a and the like) is not shown in FIG. 7 to facilitate understanding.

Figure 6:
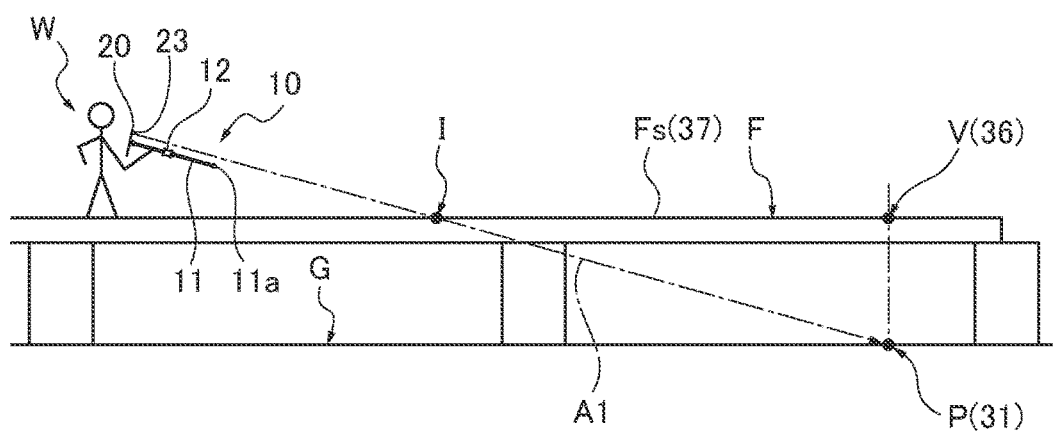
FIG. 6 is an explanatory view for explaining a reason to misrecognize a position of a target position marker in the scene image.
Figure 7:
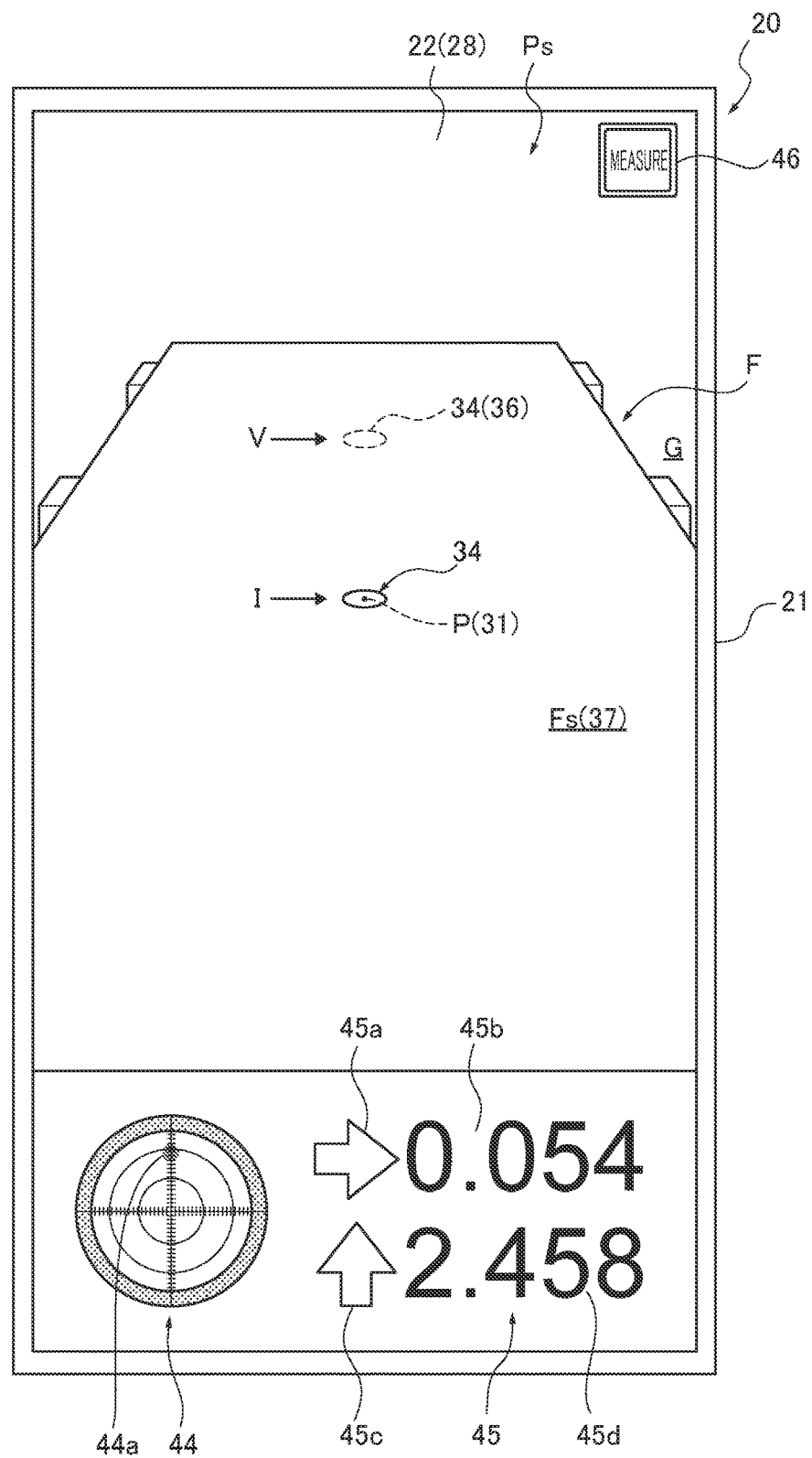
FIG. 7 is an explanatory view for explaining a case where the target position marker is moved to a misrecognized position in the scene image.

In FIG. 6, the operator W works on a raised-floor F (i.e., the floor surface Fs thereof), which is provided above the ground G. A design point P (i.e., the target position) is set on the ground G. When viewed from the imaging part 23 of the position guiding device 10 provided on the raised-floor F, the design point P is located in a direction of an arrow A1 and the arrow A1 intersects the floor surface Fs at an intersection (I). Under this circumstance, the design point P, which is set on the ground G, is not shown in a scene image Ps obtained by the imaging part 23 (see FIG. 7). Since depth information is not shown in the scene image Ps, the target coordinate information 31 representing the design point P will be indicated on the arrow A1 in FIG. 6. That is, when the target position marker 34 is displayed at a position of the target coordinate information 31 in the scene image Ps, the target position marker 34 appears as if the target position marker 34 is put at the intersection (I) on the floor surface Fs. As a result, the operator W may misrecognize the position of the target position marker 34.

In order to correctly recognize the design point P, the coordinate position of the target position marker 34 on the floor surface Fs must match the coordinate position of the design point P on the ground G in the horizontal direction even when the operator W works on the raised-floor (i.e., on the floor surface Fs). Therefore, the target position marker 34 should be shown at a position V where a vertical line passing through the design point P intersects the floor surface Fs.

In order to achieve the above, the terminal controller 24 generates corrected coordinate information 36 based on the target coordinate information 31. First, the terminal controller 24 acquires the current coordinate information 33 of the pole tip 11a based on the measurement performed by the surveying instrument 51 after setting the reference posture Pb. In case of an example of FIG. 6, the terminal controller 24 acquires the subject coordinate information 32 (i.e., the coordinate of the center position of the target 12) while pointing the floor surface Fs of the raised-floor F with the pole tip 11a, and determines the current coordinate information 33 representing the position of the pole tip 11a on the floor surface Fs based on the acquired subject coordinate information 32. The terminal controller 24 then defines the horizontal surface including the current coordinate information 33 as a measurement surface 37. In case of the example of FIG. 6, the floor surface Fs is defined as the measurement surface 37. Further, the terminal controller 24 defines a position where a vertical line passing through the target coordinate information 31 intersects the measurement surface 37 as the corrected coordinate information 36. In other words, the position corresponding to the target coordinate information 31 is moved along the vertical direction to the measurement surface 37 and then is defined as the corrected coordinate information 36. In case of the example of FIG. 6, the vertical position V where the vertical line passing through the design point P intersects the floor surface Fs (measurement surface 37) is defined as the corrected coordinate information 36.

The terminal controller 24 displays, in the scene image Ps, the target position marker 34 or target direction marker 35 at the position corresponding to the corrected coordinate information 36. In case of the example of FIG. 6, the target position marker 34 and target direction marker 35 are displayed at the vertical position V in the scene image Ps. As a result, the target position marker 34 is displayed at the vertical position V in FIG. 7. Note that the target direction marker 35 will be displayed as a straight line vertically extending upward from the position corresponding to the corrected coordinate information 36 as illustrated in FIG. 11.

As described above, the terminal controller 24 puts the target position marker 34 or target direction marker 35 at the position corresponding to the corrected coordinate information 36 in the scene image Ps so as to generate the target image 41. Here, the target image 41 containing the target position marker 34 in the scene image Ps is called a target proximity image 42 (illustrated in FIG. 12), while the target image 41 containing the target direction marker 35 in the scene image Ps is called a target remote image 43 (illustrated in FIG. 11). The terminal controller 24 selects the target proximity image 42 when the angle between the direction indicated by the pole tip 11a (i.e., the longitudinal direction of the surveying pole 11) and vertical direction is equal to or smaller than a predetermined angle. On the other hand, the terminal controller 24 selects the target remote image 43 when the above angle exceeds the predetermined angle. In the position guiding device 10, the pole tip 11a is positioned within the angle of view Av. Hence, the direction indicated by the pole tip 11a with respect to the mobile terminal 20 substantially coincides with the direction to which the imaging part 23 (i.e., the optical axis OA) turns. Namely, the pole tip 11a turns downward when the imaging part 23 photographs a proximity point, and the pole tip 11a turns to nearly the horizontal direction when the imaging part 23 photographs a remote point. Therefore, the terminal controller 24 switches the target proximity image 42 and target remote image 43 in response to the angle between the direction indicated by the pole tip 11a with respect to the mobile terminal 20 and the vertical direction.

The position guiding device 10 alarms to turn the pole tip 11a downward when the device 10 comes within a predetermined distance from the target position. In the embodiment, this alarm is achieved by displaying a message on the display 22. Alternatively, this alarm may be achieved by sounds. Here, the distance to the target position is determined based on the corrected coordinate information 36 (i.e., the target coordinate information 31) and current coordinate information 33 (i.e., the subject coordinate information 32). Note that the target proximity image 42 and target remote image 43 may be switched automatically based on the distance to the target position or may be switched by manually manipulating the operation part 28.

Additionally, the terminal controller 24 displays the target image 41 and level marker 44 on the display 22. The level marker 44 indicates the tilt state of the surveying pole 11 with respect to the vertical direction based on the detection signals of the tilt sensor 25. In the embodiment, the level marker 44 is shown as an image in imitation of a spirit level. With the level marker 44, the reference posture Pb represents the horizontal state. Namely, the level marker 44 shows the tilt state (inclination state) corresponding to the spirit level 14 provided at the target 12.

Further, the terminal controller 24 displays the position guide marker 45 together with the target image 41. The position guide marker 45 indicates the target position in view of the pole tip 11a in the scene image Ps so as to guide the operator W to the target position (corrected coordinate information 36). The position guide marker 45 of the embodiment includes a horizontal arrow sign 45a, a horizontal distance meter 45b, a vertical arrow sign 45c, and a vertical distance meter 45d. The terminal controller 24 generates the position guide marker 45 based on the current coordinate information 33 and corrected coordinate information 36, as illustrated in FIG. 4. In case of the example of FIG. 4, the corrected coordinate information 36 is located at the lower right with respect to the current coordinate information 33. Accordingly, the horizontal arrow sign 45a indicates the right direction and the vertical arrow sign 45c indicates the lower direction. Further, the terminal controller 24 generates the horizontal distance meter 45b based on an interval d1 in the horizontal direction between the current coordinate information 33 and corrected coordinate information 36 and generates the vertical distance meter 45d based on an interval d2 in the vertical direction between the current coordinate information 33 and corrected coordinate information 36. Note that as long as the position guide marker 45 indicates the target position (i.e., the corrected coordinate information 36) from the pole tip 11a in the scene image Ps, the shape of the position guide marker 45 should not be limited to that of this embodiment. For instance, the position guide marker 45 may be composed of an arrow sign extending from the pole tip 11a to the target position and a corresponding distance or may be a distance in the azimuth direction.

Further, the terminal controller 24 displays the position information button 46 together with the target image 41 on the display 22. The position information button 46 is manipulated to acquire the current coordinate information 33. The position information button 46 of this embodiment is displayed at the upper right corner on the display 22. When the position information button 46 is manipulated, the terminal controller 24 receives the subject coordinate information 32 from the surveying instrument 51 and determines the current coordinate information 33 based on the received subject coordinate information 32 and the detection signal of the tilt sensor 25. Here, the current coordinate information 33 is necessary to use the position information button 46. In other words, the surveying instrument 51 must be tracking the target 12 when the position information button 46 is manipulated.

Figure 8:
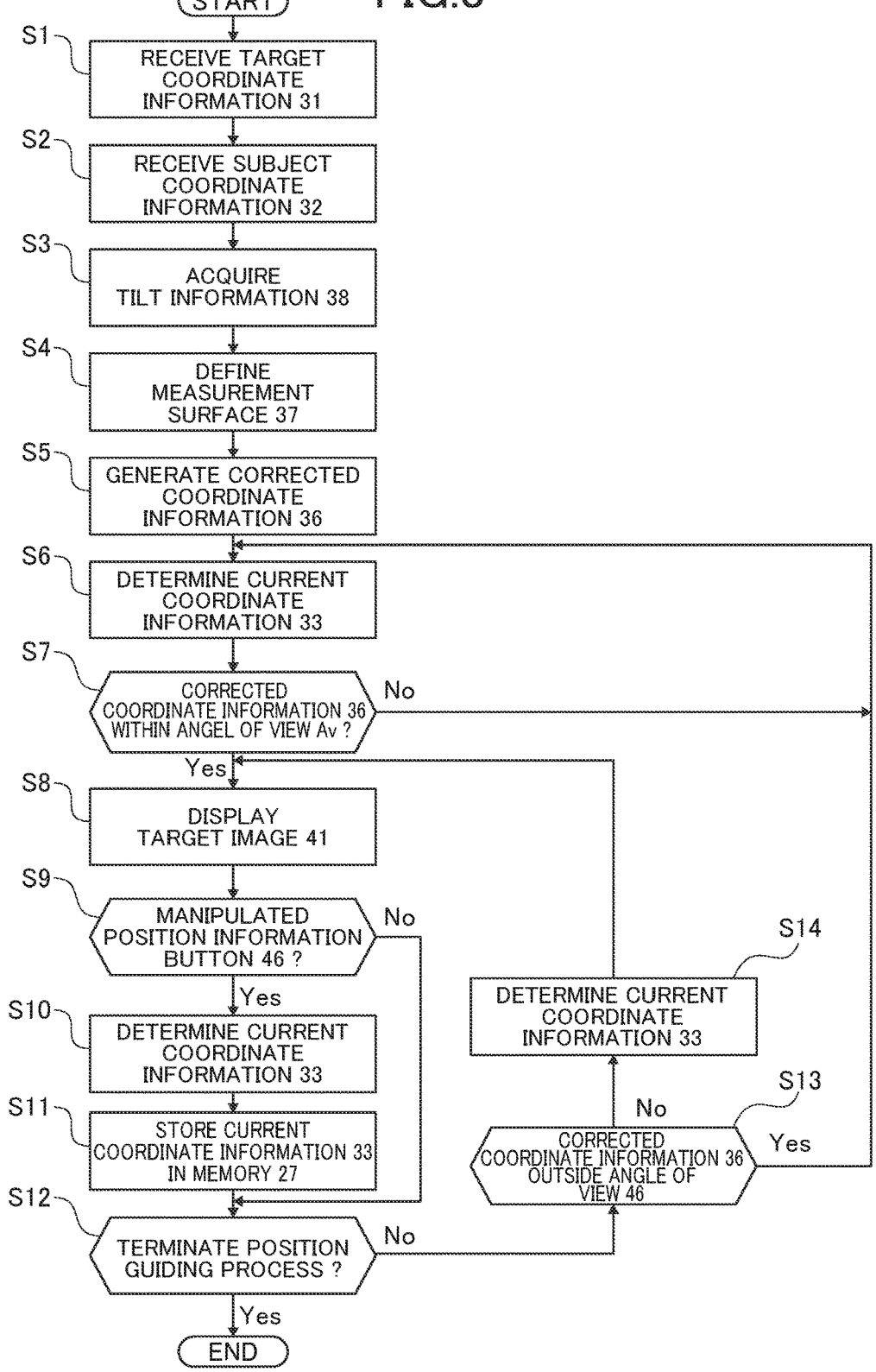
FIG. 8 is a flowchart showing an example of a position guiding process implemented by a terminal controller of the mobile terminal.

Next, position guiding process for the measurement and installation work implemented by the terminal controller 24 of the mobile terminal 20 according to the embodiment will be described with reference to FIG. 8. FIG. 8 is a flowchart showing an example of the position guiding process (position guiding method) implemented by the terminal controller 24 of the embodiment in accordance with the program stored in the memory 27. Before implementing the process of FIG. 8 flowchart, the posture of the mobile terminal 20 with respect to the surveying pole 11 is adjusted to set the reference posture Pb of the mobile terminal 20. Namely, the terminal controller 24 acquires the positional relationship of the mobile terminal 20, pole tip 11a, and target 12. FIG. 8 flowchart is commenced when the operator W manipulates the operation part 28 to perform the measurement and installation work. Once FIG. 8 flowchart is commenced, the terminal controller 24 starts obtaining the scene image Ps using the imaging part 23 and displaying the scene image Ps on the display 22 immediately and successively until FIG. 8 flowchart is terminated.

In Step S1, the terminal controller 24 receives the target coordinate information 31 (the coordinate information of the target position) from the instrument controller 68. That is, the terminal controller 24 uses the communication part 26 to receive the target coordinate information 31 transmitted through the communication part 72 from the instrument controller 68. The program then proceeds to Step S2.

In Step S2, the terminal controller 24 acquires the subject coordinate information 32 from the instrument controller 68. That is, the terminal controller 24 uses the communication part 26 to receive the subject coordinate information 32 (i.e., the current position of the center position of the target 12) that is measured by and transmitted through the communication part 72 from the instrument controller 68. The program then proceeds to Step S3.

In Step S3, the terminal controller 24 acquires tilt information from the tilt sensor 25. Here, the tilt information represents a tilt (an inclination) of the casing 21 or the surveying pole 11 with respect to the reference posture Pb. The program then proceeds to Step S4. Note that the order of Steps S1 to S3 does not matter in the present invention and therefore should not be limited to the above.

In Step S4, the terminal controller 24 sets the measurement surface 37. That is, the terminal controller 24 determines the current coordinate information 33 based on the subject coordinate information 32 and the tilt information acquired in Steps S2 and S3, and then defines the horizontal surface containing the current coordinate information 33 as the measurement surface 37. The program then proceeds to Step S5.

In Step S5, the terminal controller 24 generates the corrected coordinate information 36 based on the target coordinate information 31 and the measurement surface 37, as described above. The program then proceeds to Step S6.

In Step S6, the terminal controller 24 determines and confirms the current coordinate information 33 in the same manner as Step S4. The program then proceeds to Step S7.

In Step S7, the terminal controller 24 determines whether the corrected coordinate information 36 is present within the angle of view Av of the imaging part 23. When the determination result is affirmative, the program proceeds to step S8. When the determination result is negative, the program returns to Step S6. That is, based on the tilt information and the preset angle of view Av, the terminal controller 24 determines whether the position corresponding to the corrected coordinate information 36 is present within the angle of view Av of the imaging part 23 under the current posture of the mobile terminal 20. By making this determination, the terminal controller 24 determines whether the target position marker 34 or target direction marker 35 can be displayed in the target image 41.

In Step S8, the terminal controller 24 displays the target image 41 on the display 22. When the program proceeds to Step S8, the position corresponding to the corrected coordinate information 36 is present within the angle of view Av. Therefore, the terminal controller 24 generates the target image 41 by putting the target position marker 34 or the target direction marker 35, in the scene image Ps, at the position corresponding to the corrected coordinate information 36. Further, the terminal controller 24 displays the target image on the display 22. Here, the terminal controller 24 selects the target proximity image 42 or the target remote image 43 based on the angle between the longitudinal direction of the surveying pole 11 and vertical direction and the predetermined angle. Further, the terminal controller 24 generates the position guide marker 45 based on the current coordinate information 33 and corrected coordinate information 36 and displays the generated position guide marker 45 together with the target image 41 on the display 22. Further, the terminal controller 24 generates the level marker 44 based on the tilt information and displays the generated level marker 44 on the display 22. Also, the terminal controller 24 displays the position information button 46 on the display 22. The program then proceeds to Step S9.

In Step S9, the terminal controller 24 determines whether the position information button 46 is manipulated. When the determination result is affirmative, the program proceeds to Step S10. When the determination result is negative, the program proceeds to Step S12. That is, when the position information button 46 is manipulated, the terminal controller 24 determines that the operator W wants to measure the position of the pole tip 11a.

In Step S10, the terminal controller 24 determines the current coordinate information 33 in the same manner as Step S3. The program then proceeds to Step S11.

In Step S11, the terminal controller 24 stores the current coordinate information 33 determined in Step S10 into the memory 27. The program then proceeds to Step S12.

In Step S12, the terminal controller 24 determines whether to terminate the position guiding process. When the determination result is affirmative, the program terminates the position guiding process (the position guiding method). When the determination result is negative, the program proceeds to Step S13. That is, when the operator W manipulates the operation part 28 to terminate the position guiding process or when the operator W manipulates the operation part 28 to change a target position, the terminal controller 24 determines to terminate the position guiding process.

In Step S13, the terminal controller 24 determines whether the corrected coordinate information 36 has moved outside the angle of view Av of the imaging part 23. When the determination result is affirmative, the program returns to Step S6. When the determination result is negative, the program proceeds to Step S14. That is, based on the latest tilt information acquired in either Step S6 or Step S10 and the preset angle of view Av, the terminal controller 24 determines whether the position corresponding to the corrected coordinate information 36 generated in Step S5 has moved outside the angle of view Av under the current posture of the mobile terminal 20.

In Step S14, the terminal controller 24 determines the current coordinate information 33 in the same manner as Step S4 and Step S6. The program then proceeds to Step S8 and repeats the above-mentioned process.

Figure 9:
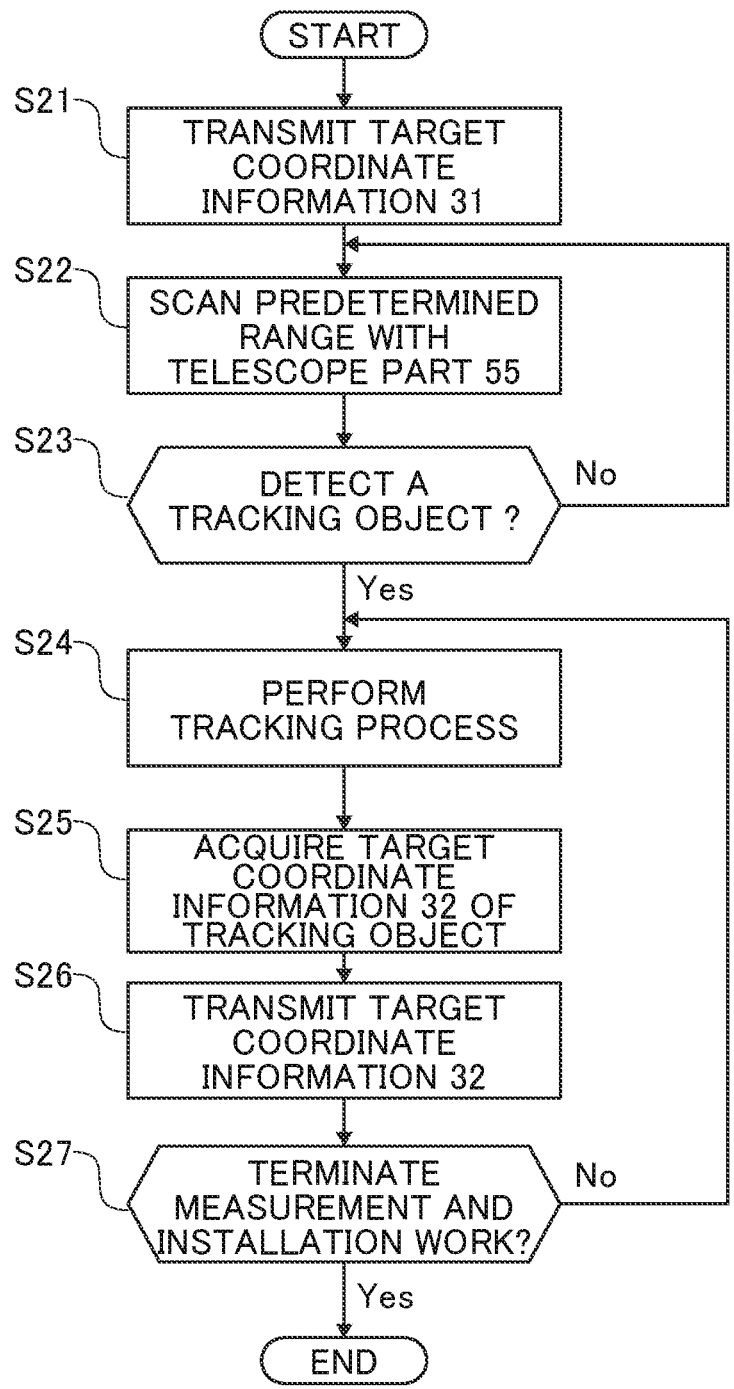
FIG. 9 is a flowchart showing an example of a measurement and installation work process implemented by an instrument controller of the surveying instrument.

Next, measurement and installation work process implemented by the instrument controller 68 of the surveying instrument 51 according to the embodiment will be described with reference to FIG. 9. FIG. 9 is a flowchart showing an example of the measurement and installation work process (measurement and installation work method) implemented by the instrument controller 68 of the embodiment in accordance with the program stored in the memory 69. FIG. 9 flowchart is commenced when the operator W manipulates the operation part 58 to perform the measurement and installation work.

In Step S21, the instrument controller 68 transmits the target coordinate information 31 (the coordinate information of the target position) via the communication part 72. The program then proceeds to S22.

In Step S22, the instrument controller 68 scans the predetermined range by the telescope part 55. That is, the instrument controller 68 controls the tracking part 63 to emit or project the tracking light and scans the predetermined range by driving the horizontal rotation driver 64 and vertical rotation driver 66 to rotate the frame part 54 and telescope 55. Note that if the scanning process has already been started, the instrument controller 68 continues the scanning in Step S22. The program then proceeds to Step S23.

In Step S23, the instrument controller 68 determines whether the tracking object (the target 12) is detected. When the determination result is affirmative, the program proceeds to Step S24. When the determination result is negative, the program returns to Step S22. To be specific, when the tracking part 63 receives the reflection light of the tracking light from the tracking object, the instrument controller 68 determines that the tracking object is detected and starts tracking the tracking object in Step S24. On the other hand, when the tracking part 63 does not receive the reflection light from the tracking object, the instrument controller 68 determines that the tracking object is not detected and continues the scanning process to detect the tracking object in Step S22.

In Step S24, the instrument controller 68 performs the tracking process. That is, the instrument controller 68 controls the horizontal rotation driver 64 and vertical rotation driver 66 based on the position information of the tracking object acquired by the tracking part 63 so as to turn the telescope part 55 to the tracking object. Note that if the tracking process has already been started, the instrument controller 68 continues the tracking process in Step S24. The program then proceeds to Step S25.

In Step S25, the instrument controller 68 acquires the subject coordinate information 32 of the tracking object as described above. The program then proceeds to Step S26.

In Step S26, the instrument controller 68 transmits the subject coordinate information 32 via the communication part 72. The program then proceeds to Step S27.

In Step S27, the instrument controller 68 determines whether to terminate the measurement and installation work. When the determination result is affirmative, the instrument controller 68 terminates the work process (measurement and installation work method). When the determination result is negative, the program returns to Step S24. That is, if the operator W manipulates the operation part 58 to terminate the measurement and installation work, the instrument controller 68 determines to terminate the work process. On the other hand, if the operator W does not manipulate the operation part 58, the instrument controller 68 determines not to terminate the work and the program returns to Step S24.

Figure 10:
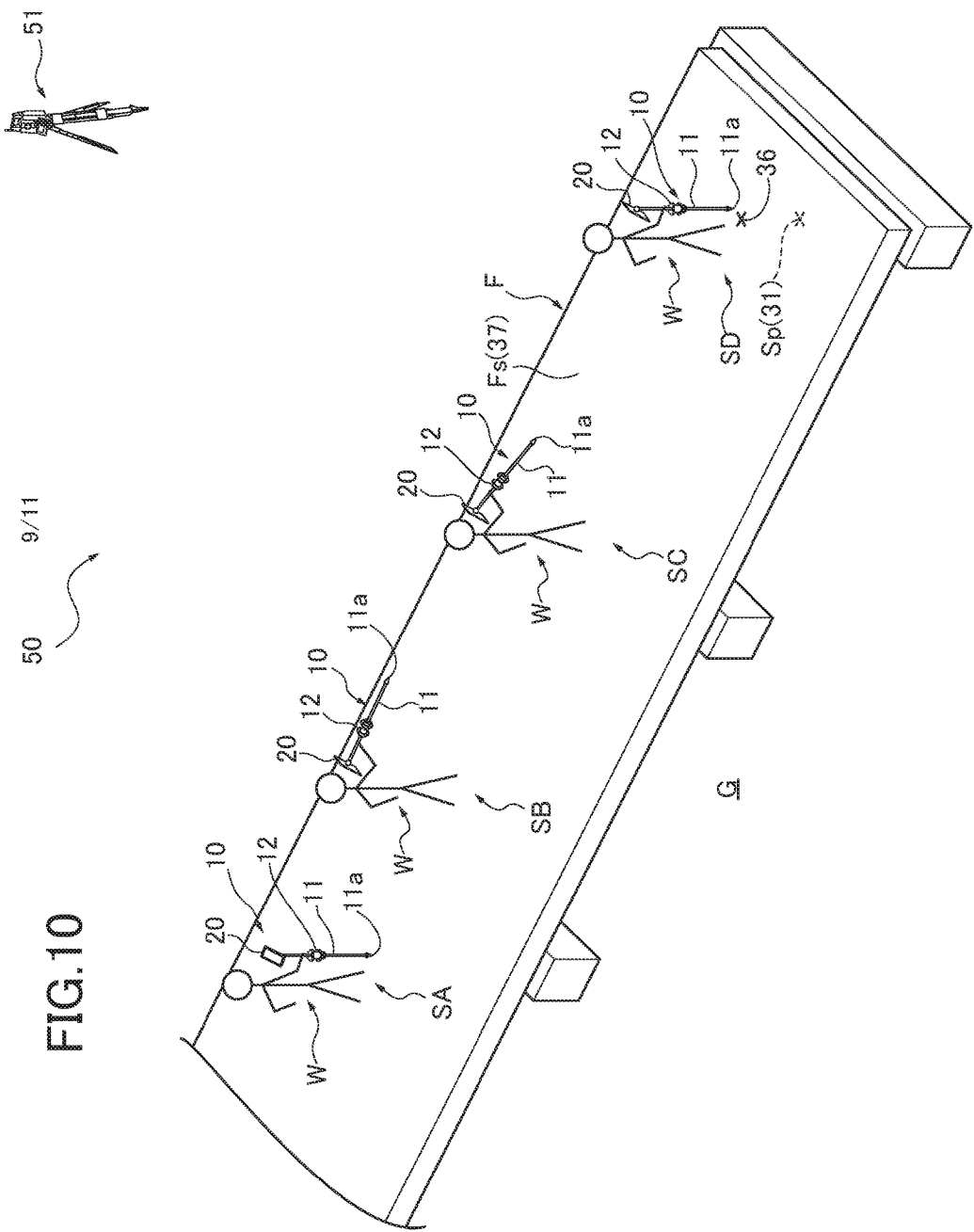
FIG. 10 is an explanatory view illustrating a case where the operator with the mobile terminal is guided to an installation point by the survey system.

Next, the measurement and installation work performed by the operator W using the position guiding device 10 will be described with reference to FIGS. 10 to 12. FIG. 10 illustrates a situation in which the operator W is working on the raised-floor F using the position guiding device 10. Here, the reference signals SA, SB, SC, and SD denote situations where the operator W works. The surveying point Sp is set on the ground G. Note that FIGS. 10 and 12 are schematically illustrated to facilitate understanding how the operator W is guided to the surveying point Sp by the position guiding device 10.

The operator W adjusts the posture of the mobile terminal 20 with respect to the surveying pole 11 before the measurement and installation work such that the terminal controller 24 acquires the positional relationships of the mobile terminal 20, pole tip 11a, and target 12 with the adjusted posture. Further, the operator W uses the spirit level 14 to align the longitudinal direction of the surveying pole 11 with the vertical direction and sets the reference posture Pb by manipulating the operation part 28.

Next, the operator W manipulates the operation part 28 to start the measurement and installation work while touching the floor surface Fs with the pole tip 11a (situation SA). The instrument controller 68 of the surveying instrument 51 then transmits the target coordinate information 31 (Step S21 of FIG. 9), and the terminal controller 24 of the mobile terminal receives the target coordinate information 31 (Step S1 of FIG. 8). Further, the instrument controller 68 detects the target 12 of the mobile terminal 20 as described above (Steps S22 and S23 of FIG. 9). The instrument controller 68 then tracks the target 12 and acquires and transmits the subject coordinate information 32 (Steps S24 to S26 of FIG. 9) repeatedly. The terminal controller 24 receives the subject coordinate information 32 (Step S2 of FIG. 8) and moves the surveying point Sp from the ground G to the floor surface Fs to generate the corrected coordinate information 36 (Steps S3 to S5 of FIG. 8).

As the preparation for starting the measurement and installation work has been completed, the operator W turns the pole tip 11a to the surveying point Sp so as to include the surveying point Sp within the scene image Ps on the display 22 (situation SB). The terminal controller 24 then determines the current coordinate information 33 corresponding to the pole tip 11a (Step S6 of FIG. 8). Further, the terminal controller 24 displays the target image 41 on the display 22 (Steps S7 and S8 of FIG. 8). In the situation SB, since the operator W stands far from the surveying point Sp, the angle between the longitudinal direction of the surveying pole 11 and vertical direction is greater than the predetermined angle. Hence, the target remote image 43 is selected and displayed on the display 22. By confirming the direction of the target direction marker 35 in the target remote image 43, the operator W can easily recognize the direction in which the surveying point Sp is present in the actual field. As described above, the target direction marker 35 extends in the vertical direction from the point on the floor surface Fs and this point has the same horizontal coordinate as the surveying point Sp. Therefore, the operator W can appropriately recognize the position of the surveying point Sp.

The operator W then gradually moves toward the surveying point Sp while pointing the pole tip 11a at the surveying point Sp (situation SC). Accordingly, the angle between the longitudinal direction of the surveying pole 11 and vertical angle becomes equal to or smaller than the predetermined angle. As a result, the target proximity image 42 is selected and displayed on the display 22 (Steps S8, S9, S12, S13, S14, and S8). By confirming the position of the target position marker 34 in the target proximity image 42, the operator W can easily recognize the position corresponding to the surveying point Sp in the actual field. Similar to the target remote image 43, the target position marker 34 indicates the position on the floor surface Fs and this position has the same horizontal coordinate as the surveying point Sp. Therefore, the operator W can appropriately recognize the position of the surveying point Sp.

Accordingly, the operator W further comes close to the surveying point Sp and points the pole tip 11a toward the surveying point Sp (situation SD). Since the operator W stands close to the surveying point Sp, the longitudinal direction of the surveying pole 11 is substantially parallel to the vertical direction and the target proximity image 42 is displayed on the display 22. Since the target proximity image 42 shows the pole tip 11a and the target position marker 34 in the scene image Ps, the operator W can easily moves the pole tip 11a to the coordinate position indicated by the target position marker 34 (i.e., to the coordinate position having the same horizontal coordinate as the surveying point Sp). Further, the display 22 also shows the position guide marker 45. Hence, the operator W can easily moves and places the pole tip 11a to the target position marker 34 (i.e., to the coordinate position having the same horizontal coordinate as the surveying point Sp) in accordance with the position guide marker 45.

After matching the pole tip 11a with the target position marker 34 in the target proximity image 42 (i.e., the scene image Ps), the operator W uses the level marker 44 to align the surveying pole 11 with the vertical direction and manipulates the position information button 46. As a result, the terminal controller 24 determines the current coordinate information 33 and stores the determined information 33 into the memory 27 (Steps S8 to S1l of FIG. 8). With this, the operator W acquires the three-dimensional coordinate position (i.e., the current coordinate information 33) representing the current position of the pole tip 11a.

Note that in the above example, the operator W always displays the target image 41 on the display 22 by pointing thee surveying point Sp with the pole tip 11a. However, the operator W may hold the surveying pole 11, for example, vertically when moving. In that case, the terminal controller 24 implements Steps S8, S9, S12, S13, S6 and S7 of FIG. 8 flowchart and repeats Steps S6 and S7 to display the scene image Ps on the display 22 without the target position marker 34 or target direction marker 35. When the operator W points the pole tip 11a at the surveying point Sp, the terminal controller 24 implements the Steps S7 and S8 of FIG. 8 flowchart to display the target image 41 on the display 22.

As described above, the position guiding device 10 (the surveying system 50) generates the target image 41 containing the target position marker 34 or target direction marker 35 and displays the target image 41 on the display to allow the operator W to plant a stake at the surveying point Sp corresponding to target coordinate information 31. With this, the operator W can confirm the position of the surveying point Sp by moving to the surveying point Sp in accordance with target image 41 and matching the pole tip 11a with the target position marker 34. Therefore, the operator W can easily reach the surveying point Sp and appropriately plant a stake.

In the position guiding device 10 of an embodiment of the present invention, the target image 41 including the target position marker 34 or target direction marker 35 is displayed over the scene image Ps. With this, the operator W can recognize and confirm the target position marker 34 and target direction marker 35 in the actual field, thereby the operator W can easily confirm the target position accurately.

Further, the target image 41 is generated by putting the target position marker 34 or target direction marker 35 at the position corresponding to the corrected coordinate information 36 in the scene image Ps. That is, the target position marker 34 or target direction marker 35 is appropriately displayed on the display 22 at the position having the same horizontal coordinate as the target position even if the height of the working surface is different from the height of the target position. Therefore, the position guiding device 10 properly guides the operator W to the target position, and the operator W can confirm the target position more accurately.

Specifically, the position guiding device 10 moves or shifts the target coordinate information 31 in the vertical direction to the measurement surface 37 so as to generate the corrected coordinate information 36. Therefore, the position guiding device 10 can display the target position marker 34 and target direction marker 35 at a position having the same height of the working surface (i.e., the measurement surface 37).

The position guiding device 10 determines the current coordinate information 33 representing the current position of the pole tip 11a based on a distance and a positional relationship between the target 12 and pole tip 11a. With this, the position guiding device 10 immediately acquires the current coordinate information 33 of the pole tip 11a by tracking the target 12.

The position guiding device 10 detects the size (length) of the target 12 (e.g., the outer edge portion 12c) in the scene image Ps and calculates the distance from the imaging part 23 to the target 12 based on the detected length of the target 12 in the scene image Ps and the angle of view Av of the imaging part 23. With this, the position guiding device 10 can automatically determine the distance and the positional relationship between the target 12 and pole tip 11a by installing the target 12 on the surveying pole 11 so as to position at least a part of the target 12 within the angle of view Av.

The position guiding device 10 selects and displays the target remote image 43 containing a target direction marker 35 in the scene image Ps when the angle between the direction indicated by the pole tip 11a with respect to the mobile terminal 20 and the vertical direction (i.e., the angle between the direction to which the imaging part 23 turns and the vertical direction) is greater than the predetermined angle. With this, the operator W can recognize the direction of the target position in the scene image Ps when the target position is away from the current location, thereby improving the usability of the device 10.

The positioning guiding device 10 selects and displays the target proximity image 42 containing a target position marker 34 in the scene image Ps when the above angle is equal to or smaller than the predetermined angle. With this, the operator W can recognize the target position in the scene image Ps when the target position is away from the current location, thereby improving the usability of the device 10.

The position guiding device 10 displays, on the display 22, the level marker 44 together with the target image 41. With this, the operator W can determine whether the surveying pole 11 (to be specific, the longitudinal direction of the surveying pole 11) is parallel to the vertical direction by referring to the display 22, thereby easily adjusting a tilt of the surveying pole 11.

The position guiding device 10 further displays the position guide marker 45 on the display 22. With this, the position guiding device 10 can guide the operator W to the target position and allow the operator W to easily match the pole tip 11a with the target position.

The position guiding device 10 further displays the position information button 46 on the display 22. The operator W uses the position information button 46 to acquire the current coordinate information of the pole tip 11a at the target position the moment the surveying pole 11 is arranged in parallel to the vertical direction. That is, the operator W does not need to hold and keep the surveying pole 11 to be in parallel to the vertical direction. Accordingly, the operator W can easily and accurately measure the position of the pole tip 11a and also reduce time for the measurement.

The position guiding device 10 receives the target coordinate information 31 and subject coordinate information 32 from the surveying instrument 51 (i.e., the instrument controller 68) via the communication part 26. Further, the position guiding device 10 determines the current coordinate information 33 by correcting the subject coordinate information 32 based on the distance and the positional relationship between the target 12 and pole tip 11a. The position guiding device 10 then generates the corrected coordinate information 36 and determines the position corresponding to the corrected coordinate information 36 in the scene image Ps in consideration of the angle of view Av. With this, the position guiding device 10 can generate the target image 41 in accordance with the more accurate current position (i.e., the current coordinate information 33) and can display the generated target image 41 on the display 22. That is, the position guiding device 10 can display the target position marker 34 or target direction marker 35 at an appropriate position in the scene image Ps. As a result, the operator W can confirm the target position more accurately.

Consequently, the position guiding device 10 of the embodiment allows the operator W to recognize and confirm the target position such as a surveying point Sp easily and accurately.

In the above embodiment, the terminal controller 24 of the mobile terminal 20 implements the above position guiding method. However, the method may be implemented by the instrument controller 68 of the surveying instrument 51 or by any other additional controller integrally or partially.

In the above embodiment, the instrument controller 68 stores the target coordinate information 31. However, the target coordinate information 31 may be stored in the memory 27 of the terminal controller 24. For instance, the target coordinate information 31 may be input to the terminal controller 24 from an external device via the communication part 26, from an external device connected to the terminal controller 24, or by manipulating the operation part 28. In this case, the communication part 26, the external device, or the operation part 28 functions as the position information acquiring part that acquires the target coordinate information 31 representing the target position such as a surveying point Sp.

In the above embodiment, the mobile terminal 20 includes the tilt sensor 25 to detect a direction. However, the sensor may be installed on outside of the mobile terminal 20 or the like. Further, as far as the sensor can detect a direction to which the imaging part 23 turns, it should not be limited thereto. For instance, the sensor may be an azimuth sensor.

In the above embodiment, the target 12 and communication part 26 are provided as the position information acquiring part. However, as long as the position information acquiring part can acquire the target coordinate information 31 and current coordinate information 33, it should not be limited thereto. For instance, the position information acquiring part may be a GPS receiver measuring a position using GNSS.

In the above embodiment, the position information button 46 is configured as an icon displayed on the display 22. However, it should not be limited thereto. For instance, the position information button 46 may be configured as a mechanical button or a switch provided at the mobile terminal 20.

Although the present invention has been described in terms of exemplary embodiment, it should not be limited thereto. It should be appreciated that variations or modifications may be made in the embodiments described by persons skilled in the art without departing from the scope of the present invention as defined by the following claims.

What is claimed is:

1. A position guiding device comprising:
    a mobile terminal that includes an imaging part configured to obtain an image with a predetermined angle of view and a display configured to display the image obtained by the imaging part;
    a pole that is fixed with the mobile terminal;
    a position information acquiring part that is configured to acquire current coordinate information representing a current location of a pole tip of the pole and target coordinate information representing a target position;
    a direction sensor that acquires information of a direction to which the imaging part turns; and
    a controller that is configured to generate a target image based on the current coordinate information and target coordinate information, the target image showing the target position as viewed from the current location, wherein
    the mobile terminal is attached to the pole so as to position the pole tip within the angle of view of the imaging part, and
    the controller is configured:
        to acquire, from the position information acquiring part, the current coordinate information representing a position indicated by the pole tip,
        to define a horizontal surface including the position indicated by the pole tip as a measurement surface,
        to generate corrected coordinate information by shifting a vertical position of the target coordinate information to a position on the measurement surface,
        to generate the target image in which a target position marker is put at a position representing the corrected coordinate information in the image obtained by the imaging part based on the information of the direction, and
        to display the target image on the display,
    the position information acquiring part includes a target for detecting a position using a surveying instrument,
    the target is attached to the pole so as to be positioned within the angle of view of the imaging part, and
    the controller is configured to calculate a distance from the mobile terminal to the target based on the angle of view and a size of the target in the image obtained by the imaging part.

2. The device according to claim 1, wherein
    the position information acquiring part includes a communication part for exchanging information between the surveying instrument and the controller, and
    the controller is configured:
        to acquire information representing the detected position of the target via the communication part, and
        to generate the current coordinate information of the pole tip based on the acquired information representing the detected position of the target and a positional relationship between the pole tip and the target.

3. The device according to claim 1, wherein the controller is configured:
    to generate the target image in which a target direction marker is put at a position representing the corrected coordinate information in the image obtained by the imaging part when an angle between the direction corresponding to the acquired information of the direction and the vertical direction exceeds a predetermined angle, and
    to display the target image on the display.

4. The device according to claim 1, wherein the controller is configured:
    to generate a level marker that indicates whether the pole is arranged in parallel to a vertical direction based on a posture of the mobile terminal with respect to the pole and the acquired information of the direction, and
    to display the level marker on the display together with the target image.

5. The device according to claim 1, wherein the controller is configured:
    to generate a position guide marker that indicates a direction and a distance from a position representing the current position coordinate information to a position representing the corrected coordinate information on the measurement surface, and to display the position guide marker on the display together with the target image.

6. The device according to claim 1, wherein the mobile terminal includes a position information button, and the controller is configured to acquire the current coordinate information from the position information acquiring part when the position information button is manipulated.

7. The device according to claim 6, wherein the position information button is displayed on the display by the controller together with the target image.

8. A position guiding method for use with a position guiding device equipped with a mobile terminal that includes an imaging part configured to obtain an image with a predetermined angle of view and a display configured to display the image obtained by the imaging part, a pole that is fixed with the mobile terminal, a position information acquiring part that is configured to acquire current coordinate information representing a current location of a pole tip of the pole and target coordinate information representing a target position, a target for detecting a position using a surveying instrument, the target being attached to the pole so as to be positioned within the angle of view of the imaging part, and a direction sensor that acquires information of a direction to which the imaging part turns; the method generating a target image showing the target position as viewed from the current location based on the current coordinate information and target coordinate information; the mobile terminal being attached to the pole so as to position the pole tip within the angle of view of the imaging part;

the method comprising:

a step of calculating a distance from the mobile terminal to the target based on the angle of view and a size of the target in the image obtained by the imaging part;

a step of acquiring, from the position information acquiring part, the current coordinate information representing a position indicated by the pole tip, a step of defining a horizontal surface including the position indicated by the pole tip as a measurement surface, a step of generating corrected coordinate information by shifting a vertical position of the target coordinate information to a position on the measurement surface, a step of generating the target image in which a target position marker is put at a position representing the corrected coordinate information in the image obtained by the imaging part based on the information of the direction, and a step of displaying the target image on the display.

* * * * *